United States Patent
Lu

(10) Patent No.: US 10,455,811 B2
(45) Date of Patent: Oct. 29, 2019

(54) COMPRESSION RESISTANT AND LONG-LASTING SCENTED DOG TOY AND ITS PREPARATION METHOD

(71) Applicant: SHANGHAI JIAYUANHUI TRADING CO. LTD., Shanghai (CN)

(72) Inventor: Lixin Lu, Shanghai (CN)

(*) Notice: Subject to any disclaimer, the term of this patent is extended or adjusted under 35 U.S.C. 154(b) by 200 days.

(21) Appl. No.: 15/519,208

(22) PCT Filed: Feb. 7, 2017

(86) PCT No.: PCT/CN2017/073016
§ 371 (c)(1),
(2) Date: Apr. 14, 2017

(87) PCT Pub. No.: WO2018/126506
PCT Pub. Date: Jul. 12, 2018

(65) Prior Publication Data
US 2018/0303067 A1   Oct. 25, 2018

(30) Foreign Application Priority Data
Jan. 6, 2017  (CN) .......................... 2017 1 0009935

(51) Int. Cl.
*A01K 29/00* (2006.01)
*A01K 15/02* (2006.01)
*C08L 7/00* (2006.01)
C08L 23/22 (2006.01)
C08L 83/04 (2006.01)
C08K 3/04 (2006.01)
C08K 11/00 (2006.01)
C08K 3/26 (2006.01)
C08K 3/34 (2006.01)
C08K 5/01 (2006.01)
C08K 5/092 (2006.01)
C08K 3/22 (2006.01)

(52) U.S. Cl.
CPC .............. *A01K 15/026* (2013.01); *C08L 7/00* (2013.01); *C08K 3/04* (2013.01); *C08K 3/346* (2013.01); *C08K 5/01* (2013.01); *C08K 5/092* (2013.01); *C08K 11/00* (2013.01); *C08K 2003/2296* (2013.01); *C08K 2003/265* (2013.01); *C08L 23/22* (2013.01); *C08L 83/04* (2013.01); *C08L 2205/03* (2013.01)

(58) Field of Classification Search
CPC .... A01K 15/026; A01K 15/025; A01K 15/02; C08L 7/00; C08L 23/22
USPC .................. 119/707, 708, 709, 710, 711, 702
See application file for complete search history.

(56) References Cited

U.S. PATENT DOCUMENTS

| | | | |
|---|---|---|---|
| 2010/0224138 A1* | 9/2010 | Axelrod | A01K 15/026 119/710 |
| 2011/0146586 A1* | 6/2011 | Turner | A01K 15/025 119/709 |
| 2011/0209669 A1* | 9/2011 | Miavitz | A01K 15/025 119/707 |
| 2013/0273125 A1* | 10/2013 | Barnvos | A01K 29/00 424/401 |
| 2014/0130750 A1* | 5/2014 | Valle | A01K 15/025 119/708 |
| 2015/0020748 A1* | 1/2015 | Wechsler | A01K 15/025 119/711 |
| 2015/0090192 A1* | 4/2015 | Powers | A01K 15/026 119/709 |
| 2015/0181839 A1* | 7/2015 | Baikie | A01K 15/026 119/710 |
| 2015/0257366 A1* | 9/2015 | Gick | A01K 15/026 119/710 |
| 2015/0296747 A1* | 10/2015 | Kellogg | A01K 15/026 119/709 |
| 2015/0313182 A1* | 11/2015 | Overman | F21V 23/0407 119/850 |
| 2016/0095297 A1* | 4/2016 | Nielsen | A01K 15/026 514/772.3 |

* cited by examiner

Primary Examiner — Trinh T Nguyen
(74) Attorney, Agent, or Firm — W&K IP

(57) ABSTRACT

A compression resistant and long-lasting scented dog toy and its preparation method. The compression resistant and long-lasting scented dog toy comprises a rubber body and cloth fluidized on it. The rubber body is made of following raw materials by weight: natural rubber, zinc oxide, camphene, stearic acid, anti-aging agent, edible gum, starch, microcrystalline wax, white carbon black, naphthenic oil, silicone rubber, butyl rubber, accelerant, antiozonant, medical light calcium carbonate, edible rapeseed oil, flavor enhancer, sour agent, talcum powder and fatty acid softening agent. The invention is made of a rubber body and cloth fluidized on it. Flavoring agents are mixed in the rubber body so as to produce a compression resistant and long-lasting scented body with durable fragrance.

6 Claims, No Drawings

COMPRESSION RESISTANT AND LONG-LASTING SCENTED DOG TOY AND ITS PREPARATION METHOD

FIELD OF THE INVENTION

The invention relates to a pet product, in particular a compression resistant and long-lasting scented dog toy and its preparation method.

BACKGROUND OF THE INVENTION

With the improvement of people's livelihood, the scope of life becomes increasingly narrow. To make up for hollow souls, an increasing number of people start to raise pets, among which dogs, the most faithful friends of human beings, are the most popular. To make pets live comfortably, there are more and more food, toys, and medicine invented for pets. While dogs are fed with food, it is more important to generate interactions between dogs and people so as to cultivate a bond and provide dogs with a free playing space. People usually achieve amusing interactions through making dogs pick up for them food or objects they throw away.

Traditionally, bones or bone-shaped objects made of other materials serve as the food for dogs to pick up while dogs are usually supposed to pick up small objects such as flying discs, shoes, and baseballs. However, traditional objects for dogs are made of a layer of cloth and sponge and are not resilient to compression or bites. In addition, available dog-biting toys are usually free of flavor. Some individual products are covered with a little spice on the surface, but the spice would soon evaporate without being retained for a long time.

SUMMARY OF THE INVENTION

The invention aims to provide a compression resistant and long-lasting scented dog toy with simple structure and durable fragrance and its preparation method to solve the problems described in above background of the invention.

The invention provides the following technical proposals to realize the purpose:

A compression resistant and long-lasting scented dog toy comprises a rubber body and cloth fluidized on it. Once the cloth is fluidized and stitched on the rubber body, fill it with PP fiber to complete the toy. The rubber body is made of following raw materials by weight: 40-60 copies of natural rubber, 1-3 copies of zinc oxide, 2-4 copies of camphene, 20-25 copies of stearic acid, 1-2 copies of anti-aging agent, 1-5 copies of edible gum, 15-20 copies of starch, 3-5 copies of microcrystalline wax, 1-3 copies of white carbon black, 15-25 copies of naphthenic oil, 10-15 copies of silicone rubber, 3-5 copies of butyl rubber, 0.3-0.7 copies of accelerant, 0.1-0.3 copies of antiozonant, 2-4 copies of medical light calcium carbonate, 3-5 copies of edible rapeseed oil, 4-6 copies of flavor enhancer, 0.4-0.6 copies of sour agent, 15-20 copies of talcum powder and 3-5 copies of fatty acid softening agent.

As a further proposal of the invention, the compression resistant and long-lasting scented dog toy comprises a rubber body and cloth fluidized on it. Once the cloth is fluidized and stitched on the rubber body, fill it with PP fiber to complete the toy. The rubber body is made of following raw materials by weight: 45-55 copies of natural rubber, 1.5-2.5 copies of zinc oxide, 2.5-3.5 copies of camphene, 21-24 copies of stearic acid, 1.2-1.8 copies of anti-aging agent, 2-4 copies of edible gum, 16-19 copies of starch, 3.5-4.54 copies of microcrystalline wax, 1.5-2.5 copies of white carbon black, 18-22 copies of naphthenic oil, 11-14 copies of silicone rubber, 3.5-4.5 copies of butyl rubber, 0.4-0.6 copies of accelerant, 0.15-0.25 copies of antiozonant, 2.5-3.5 copies of medical light calcium carbonate, 3.5-4.5 copies of edible rapeseed oil, 4.5-5.5 copies of flavor enhancer, 0.45-0.55 copies of sour agent, 16-19 copies of talcum powder and 3.5-4.5 copies of fatty acid softening agent.

As a further proposal of the invention, the compression resistant and long-lasting scented dog toy comprises a rubber body and cloth fluidized on it. Once the cloth is fluidized and stitched on the rubber body, fill it with PP fiber to complete the toy. The rubber body is made of following raw materials by weight: 50 copies of natural rubber, 2 copies of zinc oxide, 3 copies of camphene, 22 copies of stearic acid, 1.5 copies of anti-aging agent, 2 copies of edible gum, 18 copies of starch, 4 copies of microcrystalline wax, 2 copies of white carbon black, 20 copies of naphthenic oil, 12 copies of silicone rubber, 4 copies of butyl rubber, 0.5 copies of accelerant, 0.2 copies of antiozonant, 3 copies of medical light calcium carbonate, 4 copies of edible rapeseed oil, 5 copies of flavor enhancer, 0.5 copies of sour agent, 18 copies of talcum powder and 4 copies of fatty acid softening agent.

As a further proposal of the invention, the flavor enhancer is ethyl maltol, vanillin or fruity essence.

As a further proposal of the invention, the sour agent is citric acid or malic acid.

The preparation method of the compression resistant and long-lasting scented dog toy comprises following steps:

(1) Measure each raw material by specified weight;

(2) Add the zinc oxide, the microcrystalline wax, the white carbon black, the naphthenic oil, the medical light calcium carbonate and the edible rapeseed oil into a mixer and then mix them 20-30 min at a speed of 45-65 rpm to obtain the prepared auxiliary material;

(3) Put the natural rubber, the silicone rubber and the butyl rubber into an internal mixer for uniform mixing at a mixing temperature of 60-80° C. and a speed of internal mixer of 40-50 rpm. Once the material temperature increases to 85-95° C., add the prepared auxiliary material, the camphene, the stearic acid, the edible gum, the talcum powder and the fatty acid softening agent for mixing 6-10 min. After that, add the starch for uniform mixing and then discharge the prepared material at a temperature of 120-130° C.;

(4) Add the anti-aging agent, the accelerant, the antiozonant, the flavor enhancer and the sour agent for mixing 4-8 min at a reaction temperature of 140-145° C. Once the prepared material is arranged to specified shape, use the existing fluidization process to produce the rubber body.

(5) Stitch the fluidized cloth onto the semi-finished rubber body, which is then filled with PP fiber to complete the toy.

When compared with current technology, the invention has advantages as follows:

The invention is made of a rubber body and cloth fluidized on it. Flavoring agents are mixed in the rubber body so as to produce a compression resistant and long-lasting scented body with durable fragrance. In addition, cloth covering the surface or the back of rubber body can enhance the firmness and tearing resistance of product and attract dog's attention for playing. The rubber body made of natural rubber is characterized in high resilience so as to attract the dog to chase and make the dog get enough exercise through continual bouncing after being thrown out.

EMBODIMENTS

The technical proposals of the invention are described in details as follows through embodiments.

Embodiment 1

A compression resistant and long-lasting scented dog toy comprises a semi-finished rubber body. Once the semi-finished rubber body is stitched with cloth, fill it with PP fiber to complete the toy. The rubber body is made of following raw materials by weight: 40 copies of natural rubber, 1 copy of zinc oxide, 2 copies of camphene, 20 copies of stearic acid, 1 copy of anti-aging agent, 1 copy of edible gum, 15 copies of starch, 3 copies of microcrystalline wax, 1 copy of white carbon black, 15 copies of naphthenic oil, 10 copies of silicone rubber, 3 copies of butyl rubber, 0.3 copies of accelerant, 0.1 copy of antiozonant, 2 copies of medical light calcium carbonate, 3 copies of edible rapeseed oil, 4 copies of flavor enhancer, 0.4 copies of sour agent, 15 copies of talcum powder and 3 copies of fatty acid softening agent.

The preparation method of the compression resistant and long-lasting scented dog toy comprises following steps:

(1) Measure each raw material by specified weight;

(2) Add the zinc oxide, the microcrystalline wax, the white carbon black, the naphthenic oil, the medical light calcium carbonate and the edible rapeseed oil into a mixer and then mix them 20 min at a speed of 45 rpm to obtain the prepared auxiliary material;

(3) Put the natural rubber, the silicone rubber and the butyl rubber into an internal mixer for uniform mixing at a mixing temperature of 60° C. and a speed of internal mixer of 40 rpm. Once the material temperature increases to 85° C., add the prepared auxiliary material, the camphene, the stearic acid, the edible gum, the talcum powder and the fatty acid softening agent for mixing 6 min. After that, add the starch for uniform mixing and then discharge the prepared material at a temperature of 120° C.;

(4) Add the anti-aging agent, the accelerant, the antiozonant, the flavor enhancer and the sour agent for mixing 4min at a reaction temperature of 140° C. Once the prepared material is arranged to specified shape, use the existing fluidization process to produce the rubber body.

(5) Once the prepared material is arranged to specified shape, use the existing fluidization process to produce the rubber body.

Embodiment 2

The compression resistant and long-lasting scented dog toy comprises a rubber body and cloth. The cloth is stitched outside the rubber body. The rubber body is made of following raw materials by weight: 45 copies of natural rubber, 1.5 copies of zinc oxide, 2.5 copies of camphene, 21 copy of stearic acid, 1.2 copies of anti-aging agent, 2 copies of edible gum, 16 copies of starch, 3.5 copies of microcrystalline wax, 1.5 copies of white carbon black, 18 copies of naphthenic oil, 11 copy of silicone rubber, 3.5 copies of butyl rubber, 0.4 copies of accelerant, 0.15 copies of antiozonant, 2.5 copies of medical light calcium carbonate, 3.5 copies of edible rapeseed oil, 4.5 copies of flavor enhancer, 0.45 copies of sour agent, 16 copies of talcum powder and 3.5 copies of fatty acid softening agent.

The preparation method of the compression resistant and long-lasting scented dog toy comprises following steps:

(1) Measure each raw material by specified weight;

(2) Add the zinc oxide, the microcrystalline wax, the white carbon black, the naphthenic oil, the medical light calcium carbonate and the edible rapeseed oil into a mixer and then mix them 22 min at a speed of 50 rpm to obtain the prepared auxiliary material;

(3) Put the natural rubber, the silicone rubber and the butyl rubber into an internal mixer for uniform mixing at a mixing temperature of 65° C. and a speed of internal mixer of 42 rpm. Once the material temperature increases to 88° C., add the prepared auxiliary material, the camphene, the stearic acid, the edible gum, the talcum powder and the fatty acid softening agent for mixing 7 min. After that, add the starch for uniform mixing and then discharge the prepared material at a temperature of 122° C.;

(4) Add the anti-aging agent, the accelerant, the antiozonant, the flavor enhancer and the sour agent for mixing 5 min at a reaction temperature of 141° C. Once the prepared material is arranged to specified shape, use the existing fluidization process to produce the rubber body.

(5) Stitch the fluidized cloth onto the semi-finished rubber body, which is then filled with PP fiber to complete the toy.

Embodiment 3

The compression resistant and long-lasting scented dog toy comprises a rubber body and cloth. The cloth is stitched outside the rubber body. The rubber body is made of following raw materials by weight: 50 copies of natural rubber, 2 copies of zinc oxide, 3 copies of camphene, 22 copy of stearic acid, 1.5 copies of anti-aging agent, 2 copies of edible gum, 18 copies of starch, 4 copies of microcrystalline wax, 2 copies of white carbon black, 20 copies of naphthenic oil, 12 copy of silicone rubber, 4 copies of butyl rubber, 0.5 copies of accelerant, 0.2 copies of antiozonant, 3 copies of medical light calcium carbonate, 4 copies of edible rapeseed oil, 5 copies of flavor enhancer, 0.5 copies of sour agent, 18 copies of talcum powder and 4 copies of fatty acid softening agent.

The preparation method of the compression resistant and long-lasting scented dog toy comprises following steps:

(1) Measure each raw material by specified weight;

(2) Add the zinc oxide, the microcrystalline wax, the white carbon black, the naphthenic oil, the medical light calcium carbonate and the edible rapeseed oil into a mixer and then mix them 25 min at a speed of 55 rpm to obtain the prepared auxiliary material;

(3) Put the natural rubber, the silicone rubber and the butyl rubber into an internal mixer for uniform mixing at a mixing temperature of 70° C. and a speed of internal mixer of 45 rpm. Once the material temperature increases to 90° C., add the prepared auxiliary material, the camphene, the stearic acid, the edible gum, the talcum powder and the fatty acid softening agent for mixing 8 min. After that, add the starch for uniform mixing and then discharge the prepared material at a temperature of 125° C.;

(4) Add the anti-aging agent, the accelerant, the antiozonant, the flavor enhancer and the sour agent for mixing 6 min at a reaction temperature of 142° C. Once the prepared material is arranged to specified shape, use the existing fluidization process to produce the rubber body.

(5) Stitch the fluidized cloth onto the semi-finished rubber body, which is then filled with PP fiber to complete the toy.

Embodiment 4

The compression resistant and long-lasting scented dog toy comprises a rubber body and cloth. The cloth is stitched outside the rubber body. The rubber body is made of following raw materials by weight: 55 copies of natural rubber, 2.5 copies of zinc oxide, 3.5 copies of camphene, 24 copy of stearic acid, 1.8 copies of anti-aging agent, 4 copies of edible gum, 19 copies of starch, 4.54 copies of microcrystalline wax, 2.5 copies of white carbon black, 22 copies of naphthenic oil, 14 copy of silicone rubber, 4.5 copies of butyl rubber, 0.6 copies of accelerant, 0.25 copies of antiozonant, 3.5 copies of medical light calcium carbonate, 4.5 copies of edible rapeseed oil, 5.5 copies of flavor enhancer, 0.55 copies of sour agent, 19 copies of talcum powder and 4.5 copies of fatty acid softening agent.

The preparation method of the compression resistant and long-lasting scented dog toy comprises following steps:

(1) Measure each raw material by specified weight;

(2) Add the zinc oxide, the microcrystalline wax, the white carbon black, the naphthenic oil, the medical light calcium carbonate and the edible rapeseed oil into a mixer and then mix them 28 min at a speed of 60 rpm to obtain the prepared auxiliary material;

(3) Put the natural rubber, the silicone rubber and the butyl rubber into an internal mixer for uniform mixing at a mixing temperature of 75° C. and a speed of internal mixer of 48 rpm. Once the material temperature increases to 92° C., add the prepared auxiliary material, the camphene, the stearic acid, the edible gum, the talcum powder and the fatty acid softening agent for mixing 9 min. After that, add the starch for uniform mixing and then discharge the prepared material at a temperature of 128° C.;

(4) Add the anti-aging agent, the accelerant, the antiozonant, the flavor enhancer and the sour agent for mixing 7min at a reaction temperature of 144° C. Once the prepared material is arranged to specified shape, use the existing fluidization process to produce the rubber body.

(5) Stitch the fluidized cloth onto the semi-finished rubber body, which is then filled with PP fiber to complete the toy.

Embodiment 5

The compression resistant and long-lasting scented dog toy comprises a rubber body and cloth. The cloth is stitched outside the rubber body. The rubber body is made of following raw materials by weight: 60 copies of natural rubber, 3 copies of zinc oxide, 4 copies of camphene, 25 copy of stearic acid, 2 copies of anti-aging agent, 5 copies of edible gum, 20 copies of starch, 5 copies of microcrystalline wax, 3 copies of white carbon black, 25 copies of naphthenic oil, 15 copy of silicone rubber, 5 copies of butyl rubber, 0.7 copies of accelerant, 0.3 copies of antiozonant, 4 copies of medical light calcium carbonate, 5 copies of edible rapeseed oil, 6 copies of flavor enhancer, 0.6 copies of sour agent, 20 copies of talcum powder and 5 copies of fatty acid softening agent.

The preparation method of the compression resistant and long-lasting scented dog toy comprises following steps:

(1) Measure each raw material by specified weight;

(2) Add the zinc oxide, the microcrystalline wax, the white carbon black, the naphthenic oil, the medical light calcium carbonate and the edible rapeseed oil into a mixer and then mix them 30 min at a speed of 65 rpm to obtain the prepared auxiliary material;

(3) Put the natural rubber, the silicone rubber and the butyl rubber into an internal mixer for uniform mixing at a mixing temperature of 80° C. and a speed of internal mixer of 50 rpm. Once the material temperature increases to 95° C., add the prepared auxiliary material, the camphene, the stearic acid, the edible gum, the talcum powder and the fatty acid softening agent for mixing 10 min. After that, add the starch for uniform mixing and then discharge the prepared material at a temperature of 130° C.;

(4) Add the anti-aging agent, the accelerant, the antiozonant, the flavor enhancer and the sour agent for mixing 8min at a reaction temperature of 145° C. Once the prepared material is arranged to specified shape, use the existing fluidization process to produce the rubber body.

(5) Stitch the fluidized cloth onto the semi-finished rubber body, which is then filled with PP fiber to complete the toy.

The flavor enhancer is ethyl maltol, vanillin or fruity essence. The sour agent is citric acid or malic acid.

The invention is made of a rubber body and cloth. Flavoring agents are mixed in the rubber body so as to produce a compression resistant and long-lasting scented body. In addition, the cloth covering the surface of upper ball can attract dog's attention for playing and the rubber made of natural rubber is characterized in high resilience so as to attract the dog to chase and make the dog get enough exercise through continual bouncing after being thrown out.

The embodiments of the invention are described in details above but the invention is not limited to these embodiments. The invention can make all kinds of changes not deviating from the purpose of the invention within the scope of knowledge possessed by a common technicians in the field.

The invention claimed is:

1. A compression resistant and long-lasting scented dog toy, comprising:
a rubber body and cloth fluidized on it, wherein once the cloth is fluidized and stitched on the rubber body, body is filled with PP fiber to complete the toy, the rubber body further comprise, in parts by weight: 40-60 parts of natural rubber, 1-3 parts of zinc oxide, 2-4 parts of camphene, 20-25 parts of stearic acid, 1-2 parts of anti-aging agent, 1-5 parts of edible gum, 15-20 parts of starch, 3-5 parts of microcrystalline wax, 1-3 parts of white carbon black, 15-25 parts of naphthenic oil, 10-15 parts of silicone rubber, 3-5 parts of butyl rubber, 0.3-0.7 parts of accelerant, 0.1-0.3 parts of antiozonant, 2-4 parts of medical light calcium carbonate, 3-5 parts of edible rapeseed oil, 4-6 parts of flavor enhancer, 0.4-0.6 parts of sour agent, 15-20 parts of talcum powder and 3-5 parts of fatty acid softening agent.

2. The compression resistant and long-lasting scented dog toy according to claim 1, wherein the rubber body is made of following raw materials in parts by weight: 45-55 parts of natural rubber, 1.5-2.5 parts of zinc oxide, 2.5-3.5 parts of camphene, 21-24 parts of stearic acid, 1.2-1.8 parts of anti-aging agent, 2-4 parts of edible gum, 16-19 parts of starch, 3.5-4.54 parts of microcrystalline wax, 1.5-2.5 parts of white carbon black, 18-22 parts of naphthenic oil, 11-14 parts of silicone rubber, 3.5-4.5 parts of butyl rubber, 0.4-0.6 parts of accelerant, 0.15-0.25 parts of antiozonant, 2.5-3.5 parts of medical light calcium carbonate, 3.5-4.5 parts of edible rapeseed oil, 4.5-5.5 parts of flavor enhancer, 0.45-0.55 parts of sour agent, 16-19 parts of talcum powder and 3.5-4.5 parts of fatty acid softening agent.

3. The compression resistant and long-lasting scented dog toy according to claim 1, wherein the rubber body is made of following raw materials in parts by weight: 50 parts of natural rubber, 2 parts of zinc oxide, 3 parts of camphene, 22 parts of stearic acid, 1.5 parts of anti-aging agent, 2 parts of edible gum, 18 parts of starch, 4 parts of microcrystalline wax, 2 parts of white carbon black, 20 parts of naphthenic oil, 12 parts of silicone rubber, 4 parts of butyl rubber, 0.5 parts of accelerant, 0.2 parts of antiozonant, 3 parts of medical light calcium carbonate, 4 parts of edible rapeseed oil, 5 parts of flavor enhancer, 0.5 parts of sour agent, 18 parts of talcum powder and 4 parts of fatty acid softening agent.

4. The compression resistant and long-lasting scented dog toy according to claim 1, wherein the flavor enhancer is ethyl maltol, vanillin or fruity essence.

5. The compression resistant and long-lasting scented dog toy according to claim 1, wherein the sour agent is citric acid or malic acid.

6. A method of making a compression resistant and long-lasting scented dog toy according to claim 1, comprising the following steps:
(1) measure each raw material by specified weight;
(2) add the zinc oxide, the microcrystalline wax, the white carbon black, the naphthenic oil, the medical light calcium carbonate and the edible rapeseed oil into a mixer and then mix them 20-30 min at a speed of 45-65 rpm to obtain the prepared auxiliary material;
(3) put the natural rubber, the silicone rubber and the butyl rubber into an internal mixer for uniform mixing at a mixing temperature of 60-80° C. and a speed of internal mixer of 40-50 rpm, once the material temperature increases to 85-95° C., add the prepared auxiliary material, the camphene, the stearic acid, the edible gum, the talcum powder and the fatty acid softening agent for mixing 6-10 min, after that, add the starch for uniform mixing and then discharge the rubber at a temperature of 120-130° C.;
(4) add the anti-aging agent, the accelerant, the antiozonant, the flavor enhancer and the sour agent for mixing 4-8 min at a reaction temperature of 140-145° C., once the rubber is arranged to specified shape, use the existing fluidization process to produce the rubber body; and
(5) stitch the fluidized cloth onto the semi-finished rubber body, which is then filled with PP fiber to complete the toy.

* * * * *